US009287952B1

(12) United States Patent  
Park (10) Patent No.: US 9,287,952 B1  
(45) Date of Patent: Mar. 15, 2016

(54) DEVICE AND METHOD OF CONTROLLING WAVE-BASED ANTENNA

(71) Applicant: SAMSUNG SDS CO., LTD., Seoul (KR)

(72) Inventor: Kuk-Hyun Park, Suwon-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/584,390

(22) Filed: Dec. 29, 2014

(30) Foreign Application Priority Data

Oct. 16, 2014 (KR) .................. 10-2014-0140107

(51) Int. Cl.
*H04L 1/02* (2006.01)
*H04B 7/06* (2006.01)

(52) U.S. Cl.
CPC .................. *H04B 7/0602* (2013.01)

(58) Field of Classification Search
CPC . H04L 27/2647; H04L 5/0007; H04L 1/0003; H04B 7/0632
USPC ............. 375/267, 260; 370/255, 329; 455/82, 455/277.1
See application file for complete search history.

(56) References Cited

U.S. PATENT DOCUMENTS 8,705,762 B2    4/2014    Davis

2010/0177755 A1*    7/2010    Chu .................. H04W 72/1252 370/338
2012/0163317 A1*    6/2012    Yu .......................... H04B 7/024 370/329
2012/0230443 A1*    9/2012    Seok .................... H04B 7/0632 375/260

FOREIGN PATENT DOCUMENTS

| JP | 2006-237831 A | 9/2006 |
| JP | 2012-147102 A | 8/2012 |
| JP | 2012-256162 A | 12/2012 |
| KR | 10-2012-0111601 A | 10/2012 |

* cited by examiner

*Primary Examiner* — Khai Tran
(74) *Attorney, Agent, or Firm* — Sughrue Mion, PLLC (57) ABSTRACT

Provided are a device and method of controlling a wireless access in vehicular environment (WAVE)-based antenna. The device of controlling a WAVE-based antenna in WAVE-based antenna control technology of selectively operating a plurality of antennas through one control unit, includes: a WAVE modem configured to output a signal for selecting any one among the plurality of antennas; an interface unit configured to convert and output data which is transmitted and received and output the converted data when the data is transmitted and received between a control unit and a vehicle terminal according to the antenna selection signal output from the WAVE modem; and a data processing unit configured to transmit data to the interface unit for performing data conversion on the data when first data converted by the interface unit is transmitted through the selected antenna and second data transmitted from the vehicle terminal is received through the selected antenna.

12 Claims, 6 Drawing Sheets

DEVICE AND METHOD OF CONTROLLING WAVE-BASED ANTENNA

CROSS-REFERENCE TO RELATED APPLICATION

This application claims priority from Korean Patent Application No. 10-2014-0140107 filed on Oct. 16, 2014, in the Korean Intellectual Property Office, the disclosure of which is incorporated herein in its entirety by reference.

TECHNICAL FIELD

The present invention relates to a device and method of controlling a wireless access in vehicular environment (WAVE)-based antenna, and more particularly, to a device and method of controlling a WAVE-based antenna capable of increasing a communication speed by selecting an antenna in a physical method, and of improving transmission and receive performance of data through an effective interface of transmitted and received data when the antenna is selected according to the selected signal in selecting a plurality of antennas through one control unit for communication between a base station and vehicles in an WAVE-based wireless communication environment.

BACKGROUND ART

Generally, in provision of traffic information or a toll payment which is performed between a terminal installed in a vehicle and a roadside base station, wireless communication is performed, the wireless communication is a wireless communication system standard specification standard which is referred to as a wireless access in vehicular environment (WAVE) in which an IEEE 802.11p and an IEEE 1609.x are combined, and provides a communication network between the vehicles and between the vehicle and the roadside base station for a service of public security and an intelligent transportation system (ITS) as disclosed in Korea Patent Publication No. 10-2012-0111601 (publication date 2012 Oct. 10).

As such, in order to apply WAVE technology to a Hipass road, two antennas have to be connected through an Ethernet, and a fast switching operation of alternately switching the two antennas has to be performed at high speed.

Figure 1:
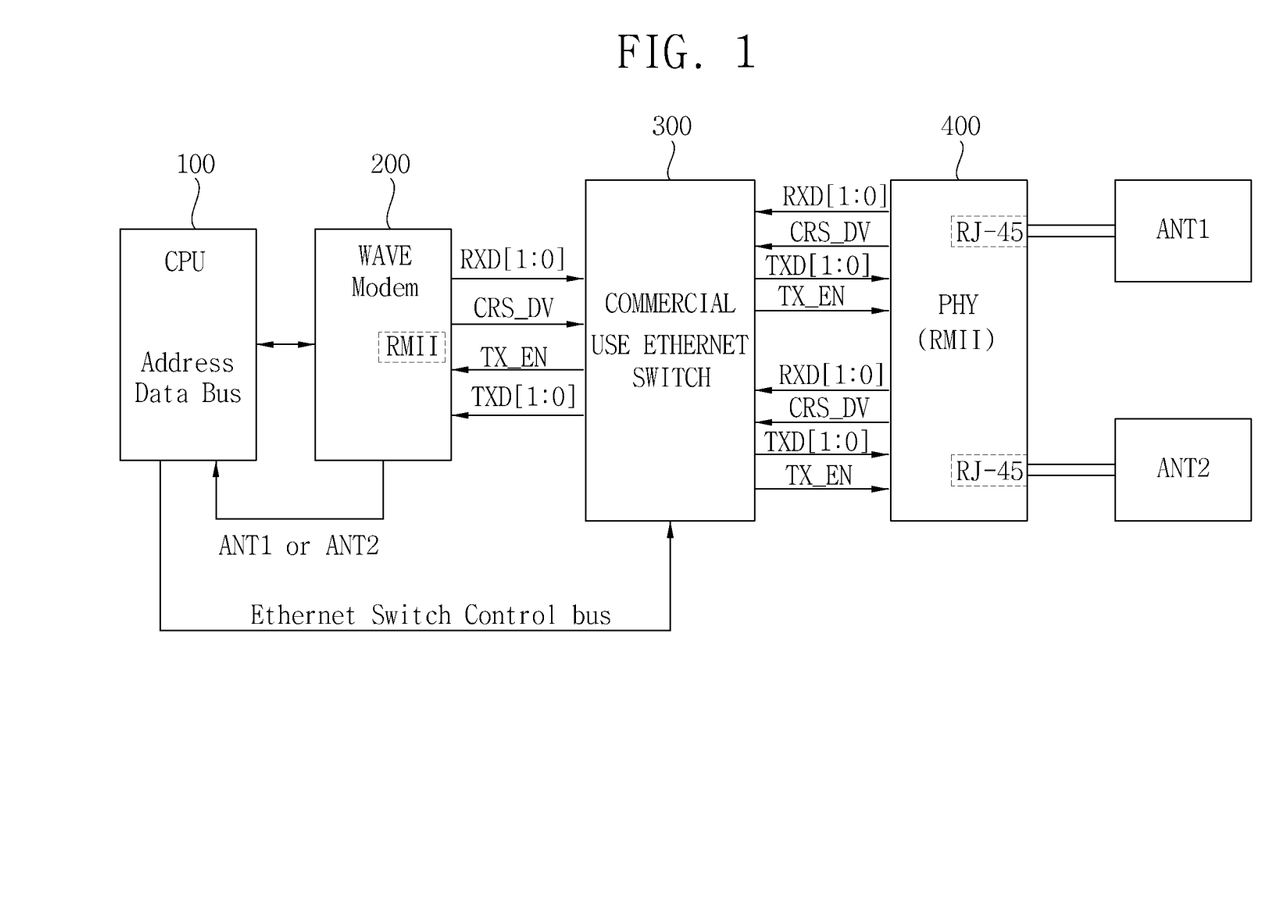
FIG. 1 is a schematic diagram illustrating a conventional wireless access in vehicular environment (WAVE) system.

Accordingly, as shown in FIG. 1, in a WAVE system according to a conventional art, when a WAVE modem 200 transmits a request signal for selecting antennas ANT1 or ANT2 to a control unit (CPU) 100, the control unit 100 controls a commercial use Ethernet switch 300, and thus a data processing unit 400 transmits data information of the base station through the selected antenna ANT1 or ANT2 or receives data from the vehicle terminal through the selected antenna ANT1 or ANT2 while performing a software switching operation of the Ethernet switch 300.

However, in the WAVE system according to the conventional art, since the WAVE modem 200 transmits the request signal for selecting the antennas to the control unit (CPU) 100 and the control unit 100 selects the antennas in the software control method of switching the Ethernet switch 300 according to the request signal, the switching control method requires a considerable time for switching the plurality of antennas ANT1 or ANT2 through one control unit (CPU) 100 and thus cannot perform communication with the vehicle terminals rapidly. Accordingly, the toll payment or information transmission cannot be effectively performed since communication with the vehicle terminals is delayed.

DISCLOSURE

Technical Problem

The present invention is directed to providing a device and method of controlling a wireless access in vehicular environment (WAVE)-based antenna capable of reducing a time for selecting any one among a plurality of antennas, preventing communication delay between a roadside base station and vehicle terminals, and performing a toll payment or information transmission more effectively by constructing a physical switching unit for selecting any one among the plurality of antennas according to an antenna selection signal output from a WAVE modem in a guide time period in which transmission or receive of data, or data exchange transmission and receive is performed in a WAVE antenna control unit, and also an interface unit for performing a data conversion operation capable of transmitting and receiving data from the physical selection switching operation of the switching unit. An object of the present invention is not limited thereto described above, and other objects which are not mentioned will be clearly understood to those of ordinary skill in the art from the following description.

Technical Solution

One aspect of the present invention provides a device of controlling a wireless access in vehicular environment (WAVE)-based antenna in WAVE-based antenna control technology of selectively operating a plurality of antennas by a control unit, including: a WAVE modem configured to output a signal for selecting any one among the plurality of antennas; an interface unit configured to convert and output data which is transmitted and received and output the converted data when the data is transmitted and received between a control unit and a vehicle terminal according to the antenna selection signal output from the WAVE modem; and a data processing unit configured to transmit data to the interface unit for performing data conversion on the data when first data converted by the interface unit is transmitted through the selected antenna and second data transmitted from the vehicle terminal is received through the selected antenna.

The WAVE modem may output the antenna selection signal to the interface unit using a guide time period for data transmission according to control of the control unit or a guide time period for data receive converted, output and transmitted by the interface unit.

The interface unit may include signal conversion units corresponding to the plurality of antennas so as to perform an interface operation by converting and outputting the transmission or receive data in a data transmission or receive period between the WAVE modem and the data processing unit, and a switching unit configured to correspond to each of the plurality of antennas, convert the data, and output the converted data in order to synchronize the transmission or receive data between the control unit and the data processing unit.

The interface unit may include a reduced media interface (RMII) to RMII interface unit for an interface with the plurality of antennas.

Another aspect of the present invention provides a method of controlling a WAVE-based antenna when one control unit in a roadside base station selectively controls a plurality of antennas for data transmission and receive with vehicle terminals, including: a first step of generating a signal for selecting any one among the plurality of antennas in a guide time period for data transmission by a WAVE modem in the roadside base station; a second step of detecting a stream division start signal of data transmitted from the WAVE modem to the interface unit when any one antenna is selected in the first step; and a third step of removing a specific signal in the data transmitted to the interface unit according to the stream division start signal detected in the second step, converting the data in which the specific data is removed, and transmitting the converted data to the data processing unit.

Advantageous Effects

According to the present invention described above, a time for selecting an antenna can be reduced, communication delay between a roadside base station and vehicle terminals can be prevented, and a toll payment or information transmission can be performed more effectively by including a physical switching unit configured to select any one among a plurality of antennas according to an antenna selection signal output from a WAVE modem in a guide time period in which transmission or receive of data, or data intersection transmission and receive is performed in a WAVE-based antenna control unit, and also an interface unit configured to convert data so as to enable the data to be transmitted and received based on the physical selection switching operation of the switching unit.

MODES OF THE INVENTION

The above and other objects, features and advantages of the present invention will become more apparent to those of ordinary skill in the art by describing in detail exemplary embodiments thereof with reference to the accompanying drawings. In the following description, when it is determined that detailed description with respect to a well-known function or construction is irrelevant to the gist of the present invention, the detailed description thereof will be omitted. Meaning of the terminology used herein is defined considering a structure, and a function, etc., the terminology may be varied according to a user, a user's intention, or customs, etc.

However, the present invention is not limited to exemplary embodiments described below, and may be implemented as different various forms. Example embodiments of the present invention are described below in sufficient detail with reference to accompanying drawings to enable those of ordinary skill in the art to embody and practice the present invention, and the present invention is only defined by claims. Therefore, the definition may be determined based on the contents described throughout the specification.

Throughout the specification, it will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof. Further, the terms "unit" and/or "part", etc. may mean a unit of processing at least function or operation, and the unit and/or the part may be implemented by hardware, software, or a combination of the hardware and the software.

Meanwhile, in exemplary embodiments of the present invention, each of components, each of function blocks or means may be constituted by one or more sub-components, and an electrical, electronic, or mechanical function in which each component performs may be implemented by various known devices or mechanical elements such as an electronic circuit, an integrated circuit, an application specific integrated circuit (ASIC), etc., and may be independently implemented or two or more blocks or means may be integrally implemented.

Further, each block or each operation may represent a portion of a module including one or more executable commands for performing one or more specific logic functions, a portion of a segment or a code. For example, consecutive two blocks or operations may actually perform the function or the operation simultaneously, and the two blocks or operations may be conversely performed according to a corresponding function.

The present invention will be described in detail below with reference to accompanying drawings.

Figure 2:
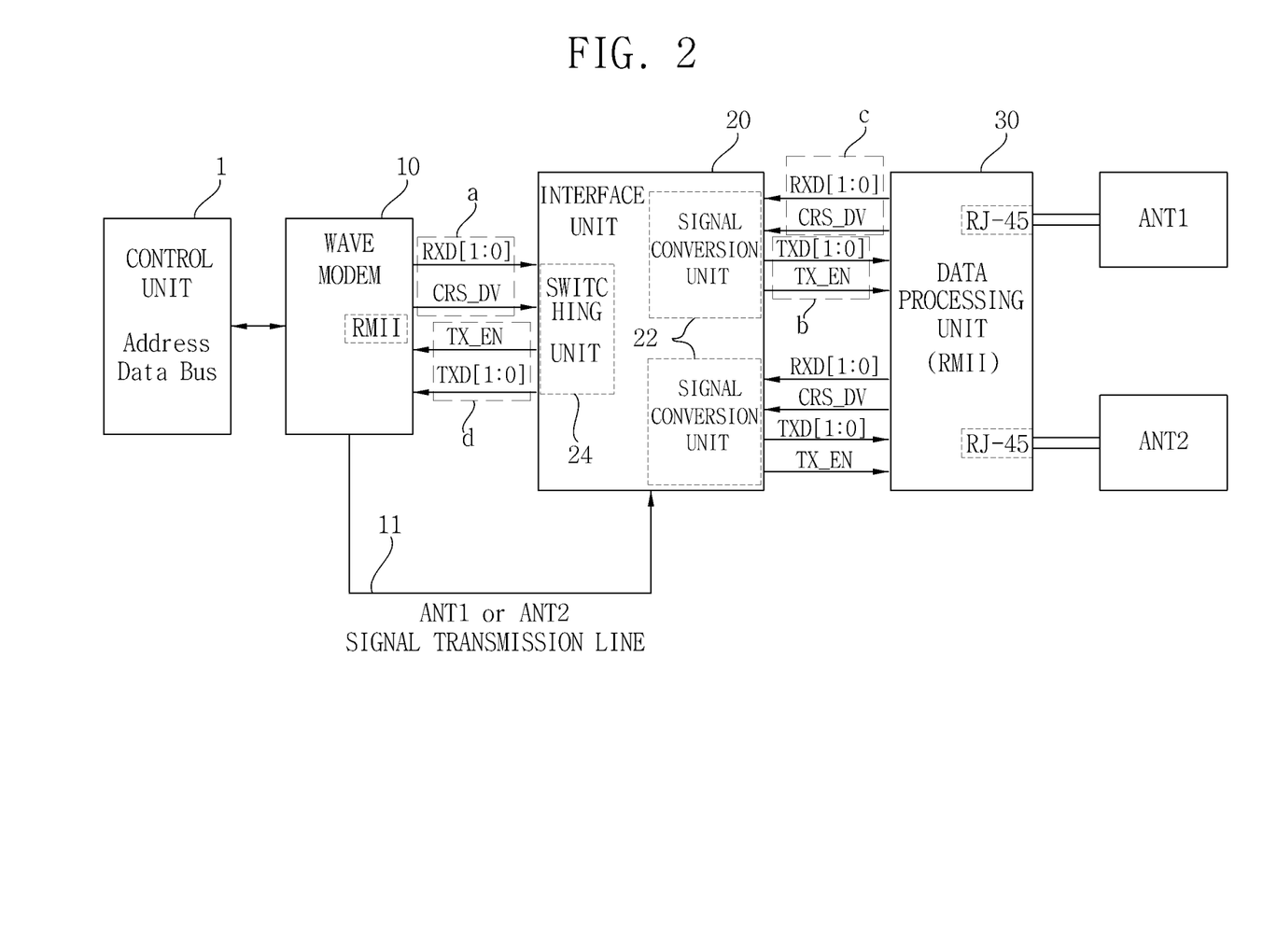
FIG. 2 is a schematic diagram illustrating a device of controlling a WAVE-based antenna according to an embodiment of the present invention.

FIG. 2 is a schematic diagram illustrating a device of controlling a WAVE-based antenna according to an embodiment of the present invention.

Referring to FIG. 2, a device of controlling a wireless access in vehicular environment (WAVE)-based antenna according to an embodiment of the present invention in WAVE-based antenna control technology of selectively operating a plurality of antennas ANT1 or ANT2 through one control unit 1 may include a WAVE modem 10 for outputting a signal for selecting any one of the plurality of antennas ANT1 or ANT2, an interface unit 20 for outputting by converting and outputting transmitted and received data RXD[1:0] and TXD[1:0] when the data is transmitted and received between the control unit 1 and a vehicle terminal according to the antenna selection signal CRS_DV output from the WAVE modem 10, and a data processing unit 30 for transmitting first data RXD[1:0] and TXD[1:0] for transmission converted by the interface unit 20 and second data TXD[1:0] and RXD[1:0] for receive of a device terminal received through the selected antenna ANT1 or ANT2 to the WAVE modem 10 through the interface unit 20 after the first data is transmitted through a selected antenna ANT1 or ANT2 and the second data is received.

Further, in a structure of a Hipass system for a payment, the control unit 1 and the antennas ANT1 or ANT2 may be separately designed since the antennas ANT1 or ANT2 are installed in a high structure and operate, and the control unit 1 may be configured to interface through an Ethernet RJ-45 in order to communicate with the antennas ANT1 or ANT2 at a long distance, and the WAVE modem 10 may include a signal transmission line 11 transmitting a signal for selecting any one among the plurality of antennas ANT1 or ANT2.

Figure 3:
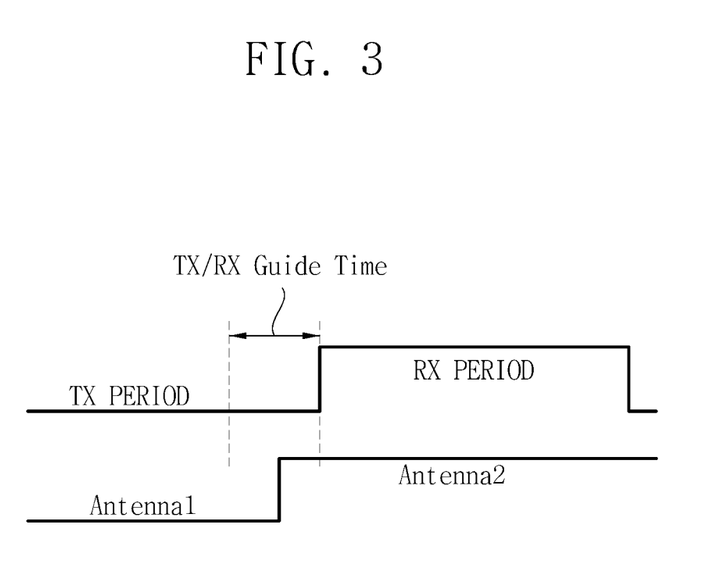
FIG. 3 is a diagram illustrating a signal using TX and RX guide times according to an embodiment of the present invention.

Further, referring to FIG. 3, the interface unit 20 may include a switching unit 24 for outputting the antenna selection signal CRS_DV to the interface unit 20 using a guide time period for data receive according to control of the control unit 1 or a guide time period for data receive transmitted by being converted and output by the interface unit 20.

Figure 4:
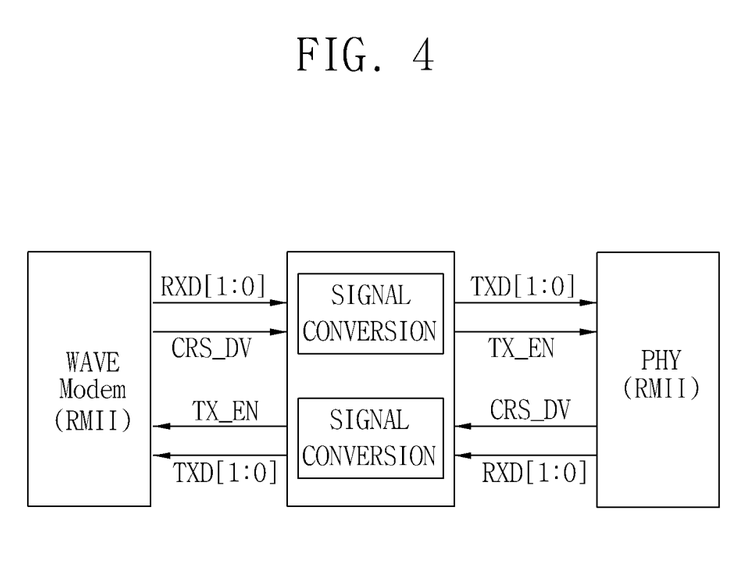
FIG. 4 is a signal connection diagram illustrating an interface state of transmission and receive data according to antenna selection according to an embodiment of the present invention.

Further, referring to FIG. 4, the interface unit 20 may include signal conversion units 22 configured to correspond to the plurality of antennas ANT1 or ANT2 so that an interface operation of converting and outputting transmission or receive data is performed in the data transmission or receive period of the WAVE modem 10 and the data processing unit 30, and a reduced media interface (RMII) to RMII interface unit for interfacing with the plurality of antennas ANT1 or ANT2.

Figure 8:
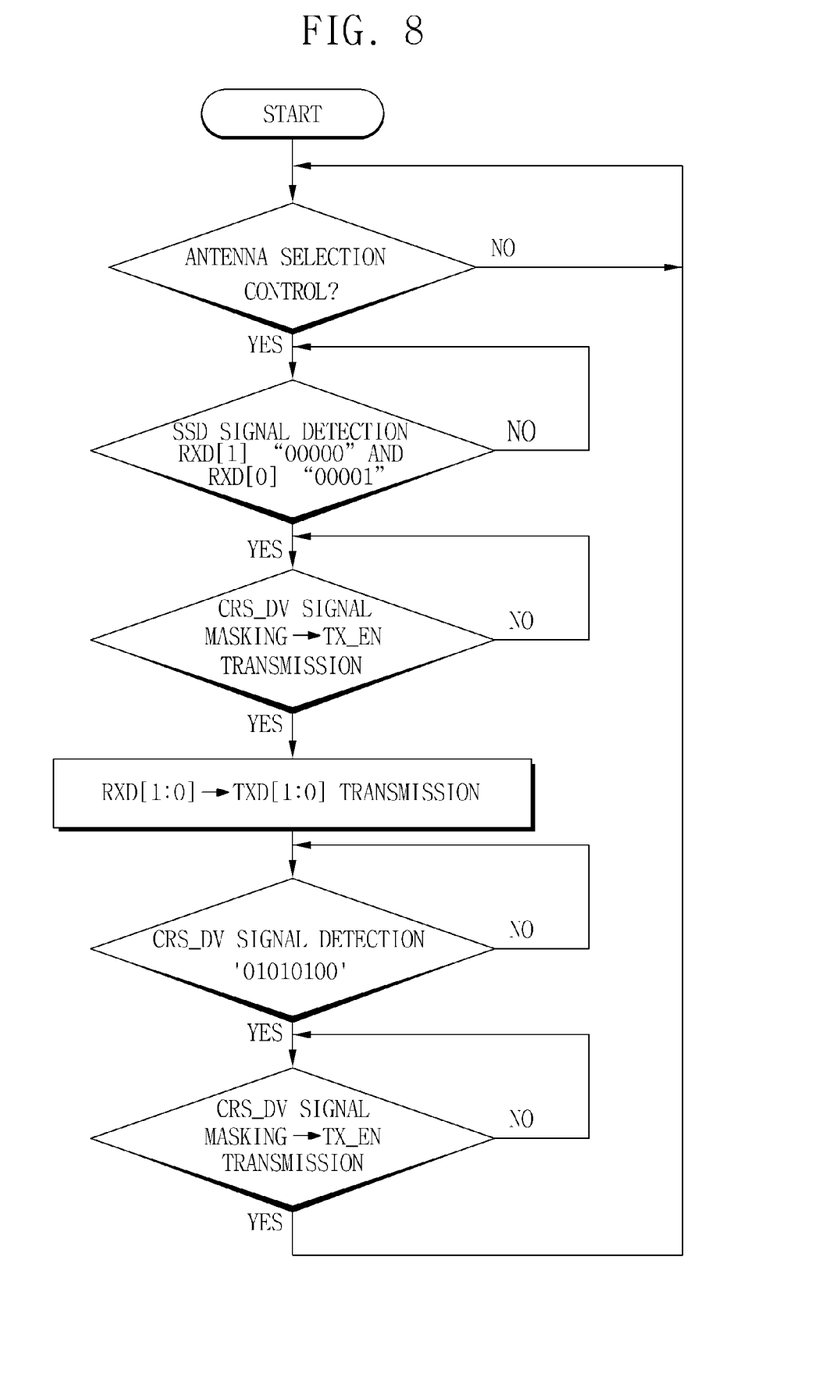
FIG. 8 is a schematic flowchart for describing a method of controlling an antenna according to an embodiment of the present invention.

Referring to FIG. 8 included herein in order to describe a method of controlling an antenna implemented by the device of controlling the WAVE-based antenna, first, as a first operation, one control unit 1 in the roadside base station may selectively control the plurality of antennas ANT1 or ANT2 for transmitting and receiving data with the vehicle terminals, and the WAVE modem 10 in the roadside base station may generate the signal for selecting any one antenna ANT1 or ANT2 among the plurality of antennas ANT1 or ANT2 in the guide time period for transmitting the data.

Next, as a second operation, when one antenna is selected based on the first operation, a stream division start signal for data transmitted from the WAVE modem 10 to the interface unit 20 may be detected by performing a signal conversion operation RXD to TXD.

Figure 5:
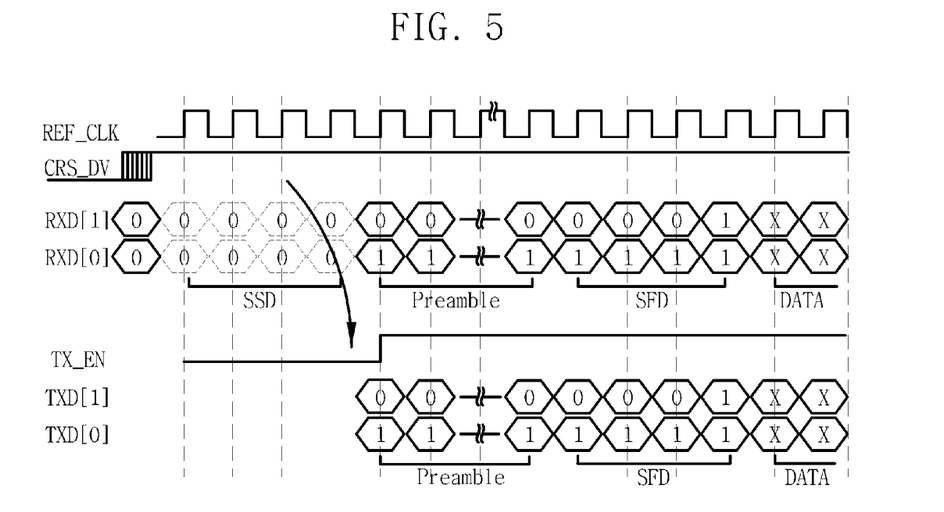
FIG. 5 is a waveform diagram illustrating a signal conversion state RXD to TXD of receive data or transmission data according to an embodiment of the present invention.

Here, referring to FIG. 5, in the signal conversion operation from the receive data RXD to the transmission data TXD, the greatest difference between waveforms of the receive data RXD and the transmission data TXD is whether or not there is a start of stream delimiter (SSD). Referring to FIG. 5, since there is the SSD in the front portion of the data frame in the receive data RXD, the SSD may be recognized in media access control (MAC). There is no the SSD in a transmission data TXD waveform. Therefore, when a receive data RXD waveform is directly input as the transmission data TXD, the receive data RXD waveform may not be recognized in a counterpart RMII. When transmitting by masking a specific signal CRS_DV in the SSD in the RMII to RMII interface unit, the SSD may be recognized as a normal signal in the counterpart RMII.

Next, as a third operation, the specific signal CRS_DV may be removed in data transmitted to the interface unit 20 according to the stream division start signal detected in the second operation, signal conversion is performed on the data which is toggled to remove the specific signal CRS_DV (CRS_DV to TX_EN), and the data may be transmitted to the data processing unit 30.

Figure 6:
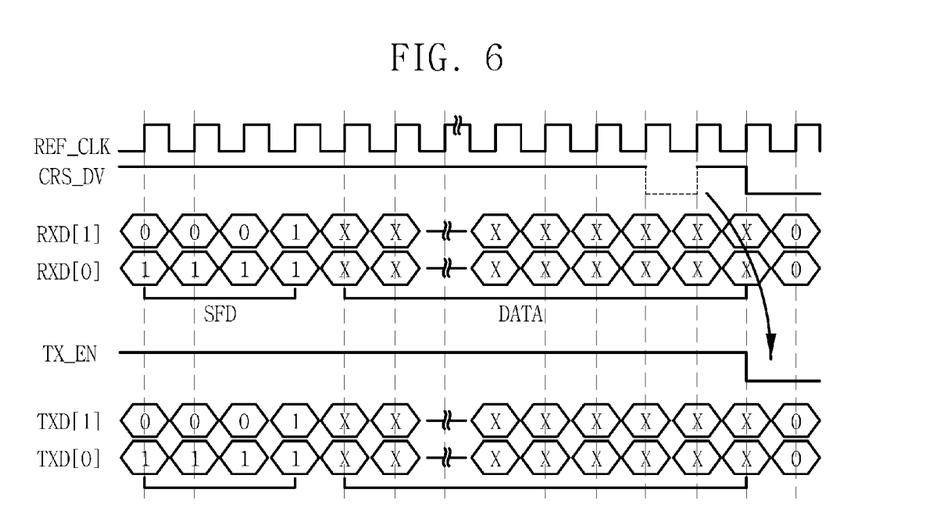
FIG. 6 is a waveform diagram illustrating a conversion state of a specific signal and an enable signal according to an embodiment of the present invention.
Figure 7:
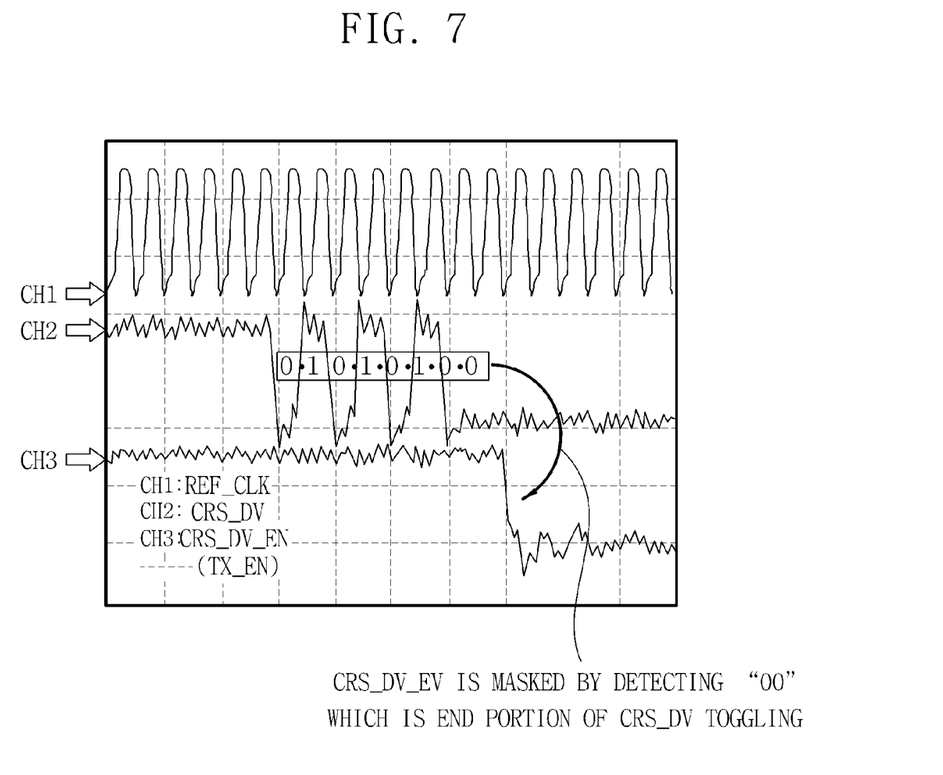
FIG. 7 is a waveform diagram illustrating a state of generating an antenna selection signal according to an embodiment of the present invention.

Here, referring to FIGS. 6 and 7, in the signal conversion operation of converting the specific signal CRS_DV to the transmission enable signal TX_EN, since the specific signal CRS_DV is masked prior to the receive signal RX_DV, the transmission enable signal TX_EN may be toggled in the end portion of the data frame in order to distinguish between a call signal COL and the receive signal RX_DV in the end portion of the data frame. When the transmission enable signal TX_EN is directly transmitted in a state of toggling, the end portion of the data frame may not be normally transmitted due to the toggling. Accordingly, when transmitting by removing a portion which is toggled, the counterpart RMII may recognize the signal as a normal signal.

When the WAVE modem 10 in the roadside base station generates the antenna selection signal for selecting one antenna ANT1 or ANT2 among the plurality of antennas ANT1 or ANT2 in the guide time period for receive of data, the data processing unit 30 may transmit data to the interface unit 20 through the selected antenna ANT1 or ANT2.

The interface unit 20 may detect the stream division start signal, remove the specific signal CRS_DV in the received data according to the detected stream division start signal, convert the received data in which the specific signal CRS_DV is removed, and transmit the converted data from the interface unit 20 to the WAVE modem 10.

That is, in order to control the plurality of antennas ANT1 or ANT2, the method may include a step (a) of transmitting data from the WAVE modem 10 to the interface unit 20, a step (b) of converting the data of the step (a) in the interface unit 20 and transmitting the converted data to the data processing unit 30, a step (c) of transmitting data received by the antenna ANT1 or ANT2 to the interface unit 20, and a step (d) of transmitting data transmitted from the data processing unit 30 to the WAVE modem 10 through the interface unit 20, and can reduce a time of selecting the antenna, prevent communication delay between the roadside base station and the vehicle terminals, and effectively perform a toll payment or information transmission.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this present invention as defined in the claims. In the claims, means-plus-function clauses are intended to cover the structures described herein as performing the recited function, and not only structural equivalents but also equivalent structures.

INDUSTRIAL APPLICABILITY

The present invention can reduce the time for selecting the antenna, prevent the communication delay between the roadside base station and the vehicle terminals, and perform the toll payment or information transmission more effectively.

The invention claimed is:

1. A device for controlling a wireless access in vehicular environment (WAVE)-based antenna in a WAVE-based antenna control technology for selectively operating a plurality of antennas through a controller, the device comprising:
    a WAVE modem configured to output an antenna selection signal for selecting any one among the plurality of antennas;
    an interface configured to convert and output data which is transmitted and received and output the converted data when the data is transmitted and received between a controller and a vehicle terminal according to the antenna selection signal output from the WAVE modem; and
    a data processor configured to transmit data to the interface for performing data conversion on the data when first data converted by the interface is transmitted through the selected antenna and second data transmitted from the vehicle terminal is received through the selected antenna.

2. The device according to claim 1, wherein the WAVE modem outputs the antenna selection signal to the interface in a guide time period for data transmission according to control of the controller or in a guide time period for data reception converted, output and transmitted by the interface.

3. The device according to claim 1, wherein the interface comprises a plurality of signal converters, each signal converter corresponding respectively to one of the plurality of antennas, so as to perform an interface operation by converting and outputting the transmission data or reception data in a data transmission period or a data reception period, respectively, between the WAVE modem and the data processor.

4. The device according to claim 1, wherein the interface comprises a switch configured to convert and output the data to each of the plurality of antennas in order to synchronize the transmission data or the reception data between the controller and the data processor.

5. The device for controlling the WAVE-based antenna according to claim 1, wherein the interface comprises a reduced media interface (RMII) to RMII interface that is configured to interface with the plurality of antennas.

6. The device according to claim 1, wherein a media access control (MAC) layer comprises the WAVE modem and the interface, and a physical (PHY) layer comprises the data processor.

7. The device according to claim 6, wherein an application layer comprises the controller.

8. A method of controlling a wireless access in vehicular environment (WAVE)-based antenna when a controller in a roadside base station selectively controls a plurality of antennas for data transmission and data reception with vehicle terminals, the roadside base station including a WAVE modem, an interface, and a data processor, the method comprising:
generating, by the WAVE modem, an antenna selection signal for selecting any one among the plurality of antennas in a guide time period for data transmission;
detecting a stream division start signal of data transmitted from the WAVE modem to the interface when any one antenna is selected based on the generated antenna selection signal; and
removing a portion of specific signal in the data transmitted to the interface according to the detected stream division start signal, converting the data from which the portion of the specific data is removed, and transmitting the converted data to the data processor.

9. The method according to claim 8, wherein, when a signal for selecting another one among the plurality of antennas in the guide time period for data reception is generated, transmitting, by the data processor, the data to the interface through the another selected antenna.

10. The method according to claim 9, further comprising:
detecting the stream division start signal from the received data in the interface, removing the portion of specific signal from the data according to the detected stream division start signal, converting the data in which the specific data is removed, and transmitting the converted data to the WAVE modem.

11. The method according to claim 8, wherein a media access control (MAC) layer comprises the WAVE modem and the interface, and a physical (PHY) layer comprises the data processor.

12. The method according to claim 11, wherein an application layer comprises the controller.

* * * * *